Oct. 21, 1941.                A. A. BYRNE ET AL                2,259,923
                           TRUCK AND TRAILER CONTROL
                     Filed June 8, 1940            2 Sheets-Sheet 1
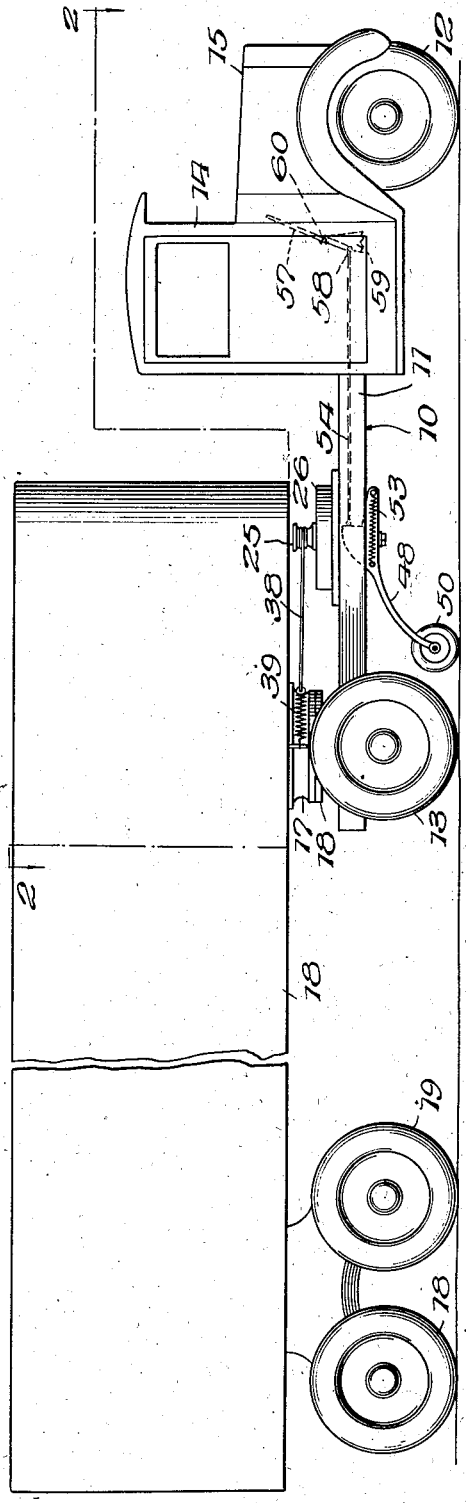
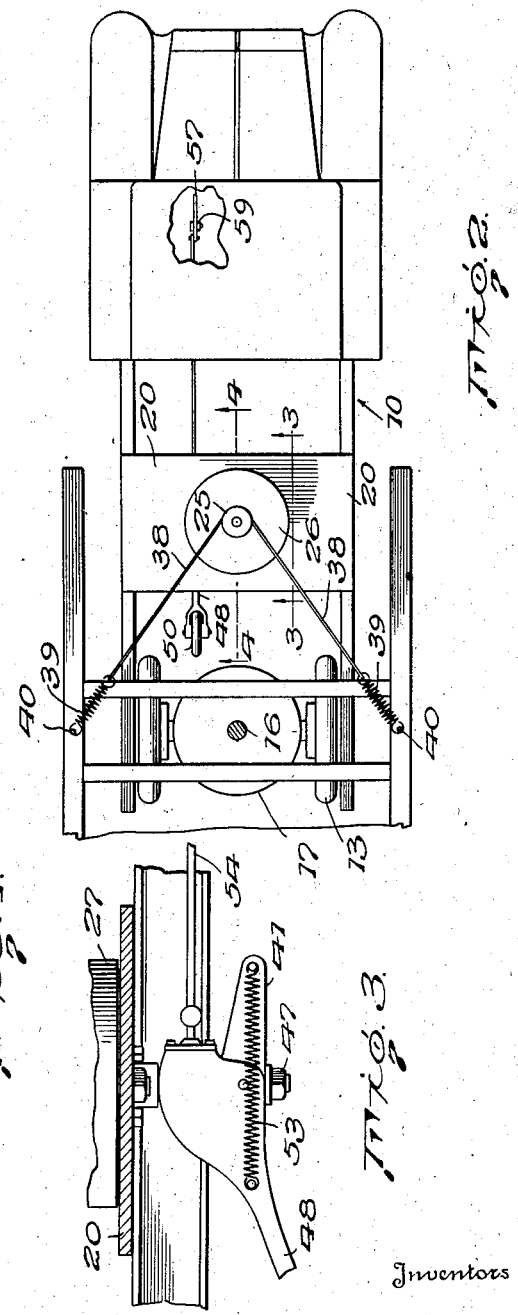
Inventors
Aelred A. Byrne
James C. Carey
By
    Attorney

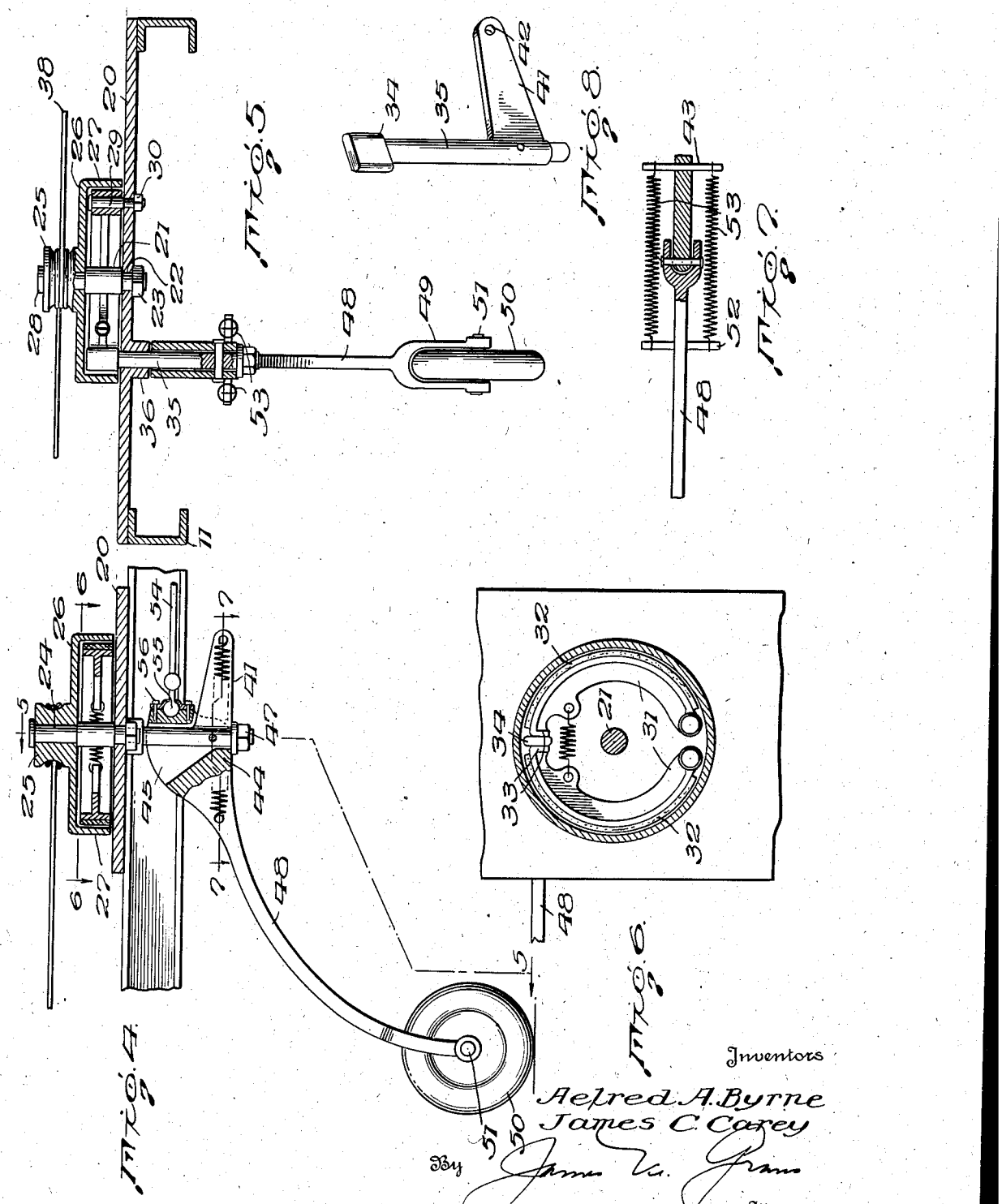

Patented Oct. 21, 1941

2,259,923

UNITED STATES PATENT OFFICE 2,259,923

TRUCK AND TRAILER CONTROL

Aelred A. Byrne and James C. Carey,
Louisville, Ky.

Application June 8, 1940, Serial No. 339,564

8 Claims. (Cl. 280—33.1)

The present invention relates to trailer and semi-trailer type trucks, busses and hauling vans.

The primary object of the invention, is to provide braking means between the truck and trailer to control the turning movement of the fifth wheel construction, whereby jack-knifing, doubling-up and skidding of the trailer truck assembly will be prevented.

A further object of the invention, is to provide braking means adjacent the fifth wheel of a trailer truck assembly which will prevent relative turning movement between the truck and trailer should the truck and trailer assembly skid on wet, icy or slippery roads as a result of an application of brakes or excessive speed while making a turn.

A still further object of the invention, is to provide braking means which will allow slight relative movement between the truck and trailer assembly in order to prevent whipping of the trailer when the brakes are applied between the truck and trailer assembly.

A still further object of the invention, is to provide a brake for limiting and restricting turning movement between the truck and trailer capable of being applied from the cab of the truck or by automatic ground engaging means which will respond to lateral motion or swaying of the trailer truck assembly to thereby set the brake.

A still further object of the invention, is to provide a device of the above mentioned character which will operate upon failure of the trailer coupling to maintain the truck and trailer in their respective positions such as disconnection of the coupler by accidental or other means, thereby preventing the truck and trailer from being telescoped or the nose of the trailer from falling on the roadway.

Other objects and advantages of the invention, will become apparent during the course of the following description of the accompanying drawings, wherein:

Figure 1 is a side elevational view of the trailer truck assembly illustrating a preferred embodiment of the invention as applied thereto.

Figure 2 is a vertical cross sectional view taken on line 2—2 of Figure 1 looking in the direction of the arrows illustrating in detail the position of the brake as applied to the truck and the limiting cable attached to the trailer and brake.

Figure 3 is a vertical cross sectional view taken on line 3—3 of Figure 2 looking in the direction of the arrows showing the automatic brake setting device controlled by a ground engaging roller.

Figure 4 is a vertical cross sectional view taken on line 4—4 of Figure 2 looking in the direction of the arrows further illustrating the automatic brake setting device and illustrating in detail the construction of the brake per se.

Figure 5 is a vertical cross sectional view taken on line 5—5 of Figure 4 looking in the direction of the arrows further illustrating the brake and automatic ground engaging control device.

Figure 6 is a horizontal cross sectional view taken on line 6—6 of Figure 4 looking in the direction of the arrows illustrating in detail the brake construction.

Figure 7 is a horizontal cross sectional view taken on line 7—7 of Figure 4 looking in the direction of the arrows illustrating in detail the off-center pivot for the ground engaging operator and the springs for moving the operator upwardly past dead center, and Figure 8 is a perspective view of the cam operator for setting the brake shoes in engagement with the brake drum.

In the drawings, wherein for the purpose of illustrating the invention and wherein like reference characters will be employed to designate like parts throughout the same, the reference character 10 will generally be employed to represent a truck including a chassis frame 11 supported by front and rear wheels 12 and 13 respectively. The truck also includes a cab 14 and hood 15 under which is provided the usual motor.

The truck chassis frame 11 is provided at its rear end with a fifth wheel support 16 having the usual spherical pin for receiving the coupling member 17 carried on the forward end of the trailer 18. As is the usual custom, the trailer is supported by dual wheels 19 mounted on suitable spring suspensions and running gear.

The invention comprises a supporting base 20 secured to the chassis frame 11 by welding or the like, and mounted on the base 20 is a vertical spindle 21 having a reduced portion 22 extending through an opening in the base and anchored by means of a nut 23 threaded on the end thereof. The upper end of the spindle 21 is reduced as at 24 and extends through the hub portion of a pulley 25 which is secured to a brake drum 26 having a flange 27. The pulley 25 and brake drum 26 are locked against displacement on the spindle 21 by upsetting the upper end thereof as at 28.

Also anchored to the base 20 are pins 29 held in place by nuts 30 threaded on the ends thereof as shown in Figure 5 for receiving a pair of brake shoes 31 having friction brake elements 32 for engaging the inner periphery of the brake drum flange 27. The free ends of the brake shoes are provided with abutments 33 for being engaged by a cam operator 34 formed on the upper end of an operating shaft 35 journaled in a boss 36 formed on the underside of the supporting base 20. Rotation of the shaft 35 will cause the oscillation of the cam 34 to set the brake shoes 31 and lock the brake drum 26 against rotation.

Secured to opposite sides of the fifth wheel construction 17 is a cable 38 by means of coil springs 39 and said cable 38 is trained around the pulley 25 three or four times so that it will be securely fastened to the pulley carried by the brake drum. The coil springs 39 are connected to the underside of the trailer 18 by suitable fastening elements 40 such as bolts or the like. If desired, only one coil spring may be used and it is to be understood that the coil springs may be made of any size desired to meet the exigencies of the particular construction. It will be obvious, that turning movement of the trailer 18 in a lateral direction with respect to the truck 10 will rotate the brake drum 26 when the brake shoes 31 are not set and that when the brake shoes are set, as by means of a control from the truck cab, the brake drum will lock the cable 38 against movement except to the limit of the extension of the coil springs 39.

Formed on the operating shaft 35 is a wing extension 41 having an opening 42 in the end thereof for receiving a pin 43. Pivotally attached to the lower end of the operating shaft is a casing 44 having a tapered opening 45 for allowing free swinging movement of the casing about a pivot pin 46 extending therethrough. A nut 47 is threaded on the lowermost end of the operating shaft 35 for supporting some of the weight of the casing 44 when the swinging arm 48 is in its lowermost position. Formed integral with the casing 44 is a curved extension 48 having a lower bifurcated end 49 in which is mounted a ground engaging wheel 50 supported by an axle pin 51.

A pin 52 is also secured to the casing 44 and is provided with a pair of coil springs 53 which connect with the pin 43 carried by the wing extension 41. It will be noted that the pins 43 and 52 are offcenter from the pivot pin 46 so that the coil springs 53 will move the extension 48 upwardly after the pin 52 passes dead center. When the extension 48 is lowered, the coil springs exert a downward pull thereon to urge the ground engaging roller 50 in contact with the road surface.

It is intended to raise and lower the extension 48 from the cab 14 by means of a control rod 54 having one end connected to a ball and socket joint as at 55 secured to the housing 44 as at 56. The opposite end of the control rod 54 connects with an operating handle 57 as at 58 fulcrumed to a support 59 as at 60.

During normal driving conditions, the ground engaging wheel 50 will be held in a raised position and out of contact with the ground whereupon lateral turning movement of the trailer and truck may take place in the usual manner. When driving over a slippery or wet road, the driver in the cab 14 may operate the lever 57 to lower the extension 48 and cause the ground wheel 50 to engage the road surface. Should the truck and trailer start to slide or skid, resulting in jackknifing, the ground engaging wheel and extension 48 will move laterally thereby rotating the operating shaft 35 with the resultant turning of the cam 34 to separate the abutting faces 33 of the brake shoes 31 and force the brake shoes into engagement with the flange of the brake drum 26.

When the brake shoes 31 have thus been set, the pulley 25 is held against rotation on the supporting pin 24 and the trailer is locked against turning movement with respect to the truck 10 with the exception of a slight play by reason of the end connecting coil springs 39. After the driver has passed over the slippery road in safety, the extension 48 and ground wheel may be raised from the road surface by operation of the cab control 57.

It is to be understood, that the form of the invention herewith shown and described is to be taken as a preferred embodiment of the same and that mechanical or hydraulic means may be employed for setting the brakes and other parts and that various changes in the shape, size and arrangement of the brake assembly and its cooperating parts may be resorted to without departing from the spirit of the invention or the scope of the subjoined claims.

We claim:

1. In combination with a truck and trailer assembly having a fifth wheel coupling, a brake located on the truck, a brake drum associated with the brake, a spring loaded cable having its ends fastened to the trailer on opposite sides of the fifth wheel coupling and connected with the brake drum and ground engaging means for operating the brake to limit rotation of the brake drum.

2. In combination with a truck and trailer assembly having a fifth wheel coupling, a brake carried by the truck, a pulley mounted on the brake normally rotatable with the brake, a cable passing around the pulley and having its ends connected to the trailer and ground engaging means for setting the brake operable upon lateral motion of the truck trailer assembly.

3. In combination with a truck and trailer assembly having a fifth wheel coupling, a brake drum rotatably mounted on the truck adjacent the coupling, a pulley formed integral with the brake drum, a cable trained around the pulley and having its ends secured to the trailer at diametrically opposite points with respect to the fifth wheel coupling and ground engaging means for preventing rotation of the brake drum upon lateral movement of the truck trailer assembly.

4. In combination with a truck and trailer assembly having a fifth wheel coupling, a brake and brake drum located on the truck on a vertical axis, a pulley formed on the brake drum, a cable surrounding the pulley and having its ends connected to the trailer adjacent the fifth wheel coupling, ground engaging means for setting the brake and manual means controllable from the cab of the truck for raising and lowering the ground engaging means.

5. In combination with a truck and trailer assembly having a fifth wheel coupling, a pair of brake shoes secured to the truck, a brake drum mounted on a vertical axis cooperable with the brake shoes, an operating shaft rotatable with respect to the brake shoes having a cam for setting the brake shoes, a cable passing around the brake drum and having its ends secured to the trailer on opposite sides thereof, a downwardly extending lever pivoted to the operating shaft, a ground engaging roller on the lower end of the downwardly extending lever and means operable from the cab of the truck for raising and lowering the downwardly extending lever and ground engaging roller with respect to the road surfaces.

6. In combination with a truck and trailer assembly having a fifth wheel coupling, a brake drum rotatably mounted on the truck adjacent the coupling, a pulley formed integral with the brake drum, a spring loaded cable trained around the pulley and having its ends secured to the trailer at diametrically opposite points with respect to the fifth wheel coupling, and ground engaging means for setting the brake to limit rotation of the brake drum upon lateral movement of the truck trailer assembly.

7. In combination with a truck and trailer assembly having a fifth wheel coupling, a brake and brake drum located on the truck, a pulley carried by the brake drum, a spring loaded cable surrounding the pulley and having its ends connected to the trailer adjacent the fifth wheel coupling, ground engaging means for setting the brake and manual means controllable from the cab of the truck for raising and lowering the ground engaging means.

8. In combination a tractor vehicle and a trailer vehicle, a fifth wheel connection between said vehicles, retarding means carried by one of said vehicles and operative on said fifth wheel to retard relative rotation between said tractor and trailer vehicles, and means including a ground engaging element mounted on one of said vehicles and responsive to sudden relative lateral movement between said vehicles for controlling said retarding means.

AELRED A. BYRNE.
JAMES C. CAREY.